UNITED STATES PATENT OFFICE.

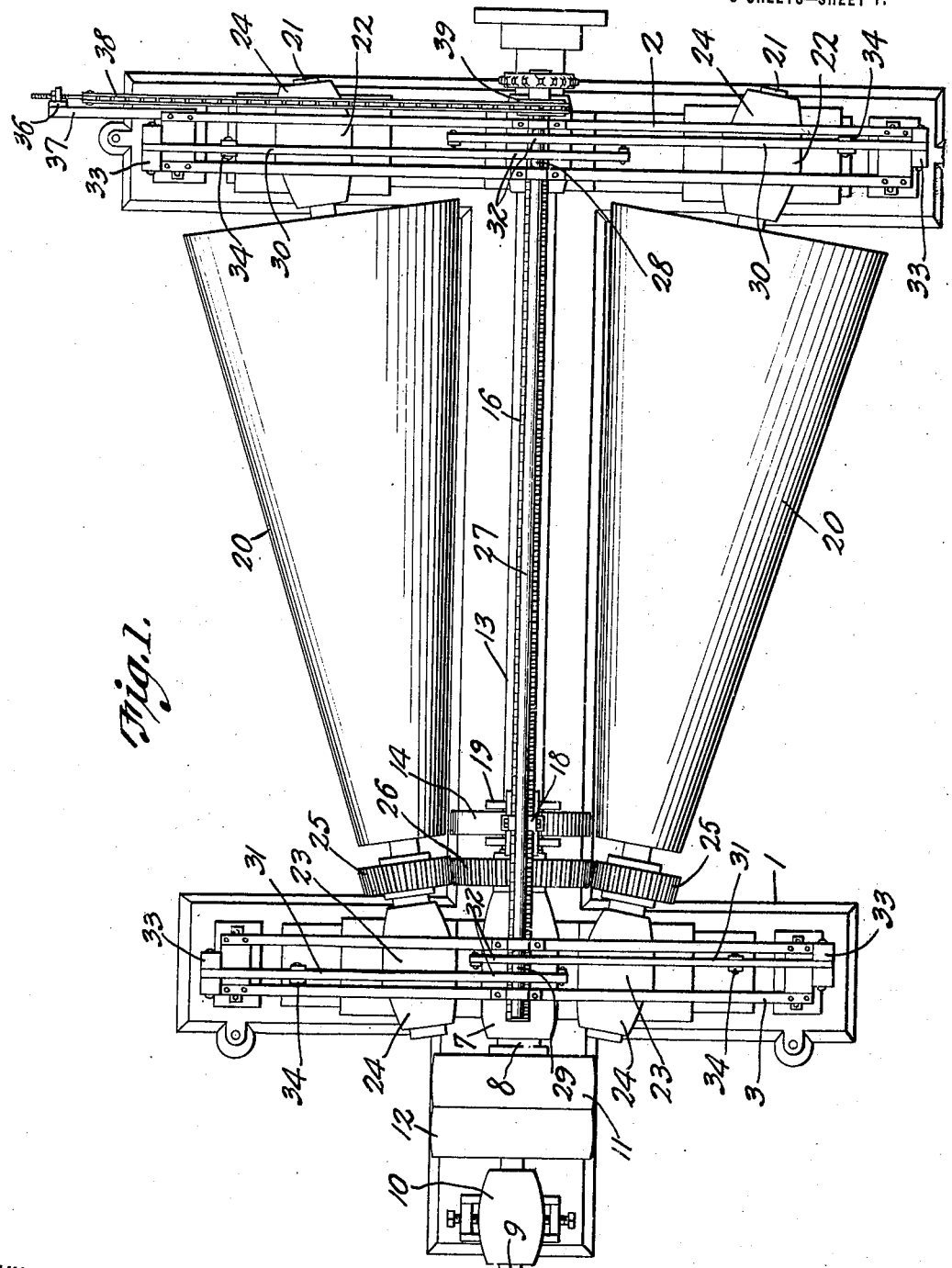

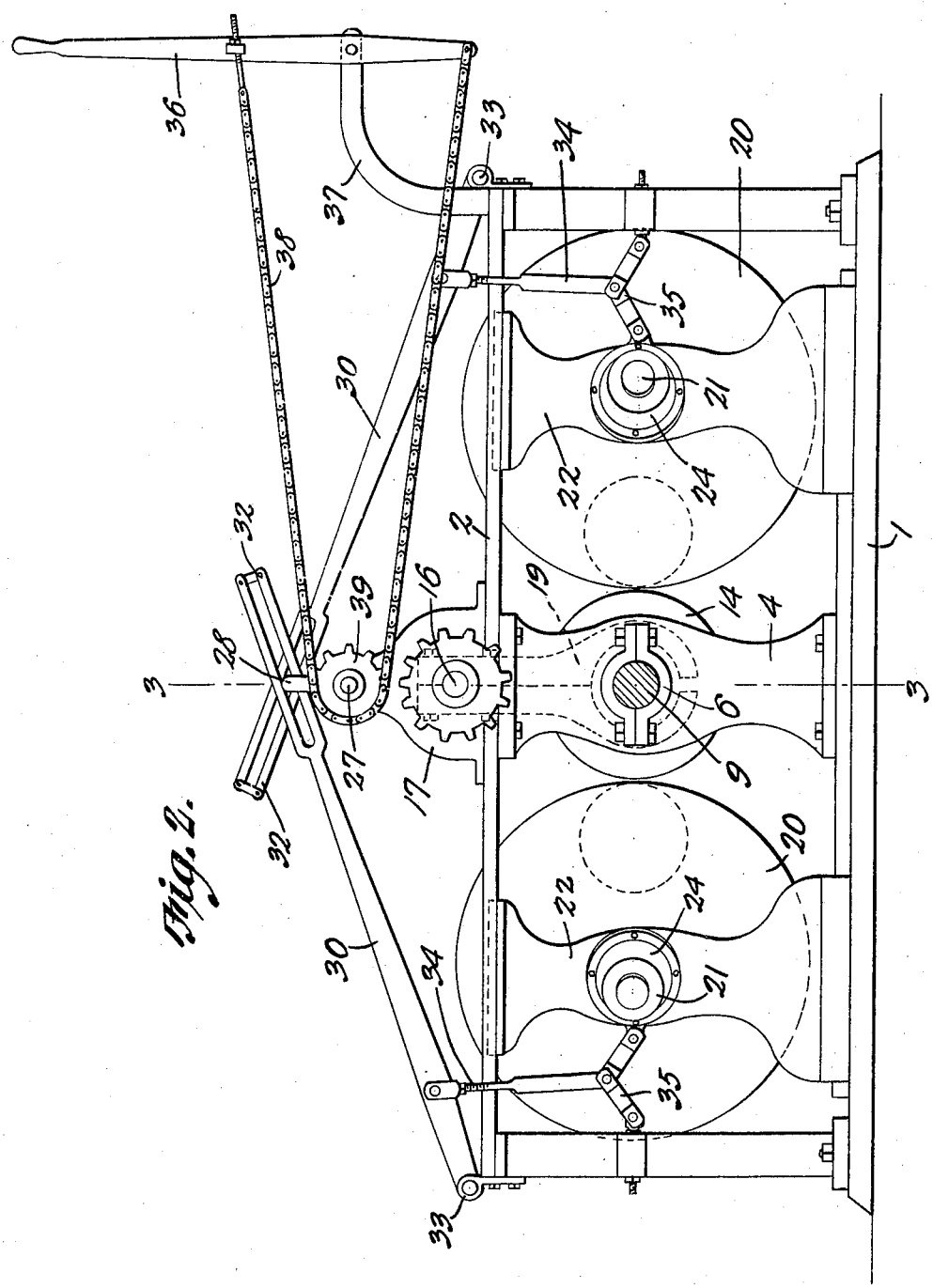

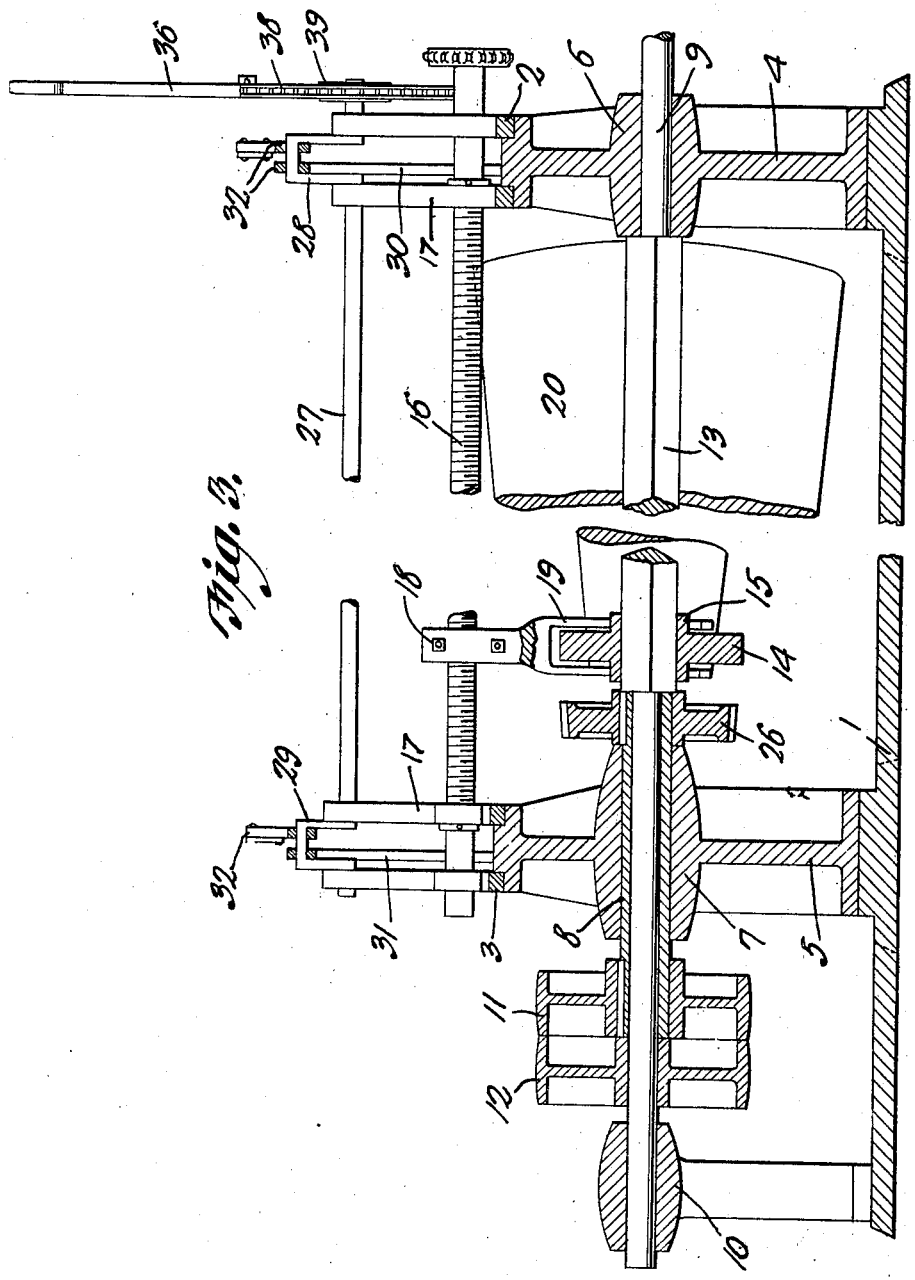

FRANK BELAND, OF CAIRO, ILLINOIS.

VARIABLE-SPEED-TRANSMISSION MECHANISM.

1,178,834.   Specification of Letters Patent.   Patented Apr. 11, 1916.

Application filed April 22, 1915. Serial No. 23,179.

*To all whom it may concern:*

Be it known that I, FRANK BELAND, a citizen of the United States, residing at Cairo, in the county of Alexander and State of Illinois, have invented a new and useful Variable-Speed-Transmission Mechanism, of which the following is a specification.

The present invention appertains to speed transmission mechanisms, and aims to provide a variable speed transmission mechanism of novel and improved construction and operation, and adapted especially for use in connection with lathes, although the transmission mechanism may be adapted for various other purposes, whereby a driven element may be rotated at various ratios with respect to the driving element and so that the lathe or other device may be speeded as desired and at the will of the operator.

It is the object of this invention to provide a variable speed transmission mechanism embodying a unique assemblage and coöperation of the component elements, whereby the efficiency and utility of the mechanism are enhanced, and in order that the present transmission mechanism will serve its office in a thoroughly practical and desirable manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a plan view of the improved mechanism. Fig. 2 is an end view thereof, the remote parts being omitted for purpose of clearness, and the view being on an enlarged scale. Fig. 3 is a longitudinal section of the mechanism on an enlarged scale, taken on the line 3—3 of Fig. 2, parts being broken away.

In carrying out the invention, there is provided a suitable base 1 having upstanding transverse frames 2 and 3 at its opposite ends and parallel with one another, the frames 2 and 3 forming with the underlying portions of the base, lateral guides for the purposes which will hereinafter more fully appear. Pedestals or standards 4 and 5 are secured between the tops of the respective frames 2 and 3 and the base 1, between the ends of the frames, and the standards 4 and 5 are provided with the respective bearings 6 and 7.

A tubular shaft 8 is journaled through the bearing 7 and one end of the mechanism, and a longitudinal shaft 9 is journaled through the bearing 6 at the other end of the mechanism, and extends through the tubular shaft 8 and a tail pedestal or bearing 10 carried by the rear end of the base beyond the rear frame 3. The shaft 9 is journaled within the tubular shaft 8 and pedestal or bearing 10, and a pulley wheel 11 is keyed upon the outer protruding portion of the tubular shaft 8, while a pulley wheel 12 is mounted loosely upon the shaft 9 between the pulley wheel 11 and bearing 10. The pulley wheel 12 is mounted adjacent the pulley wheel 11, whereby the belt (not shown) may be readily shifted from one pulley wheel to the other to connect and disconnect the drive shaft (not shown) to and from the tubular shaft 8, respectively. The tubular shaft 8 is the driving shaft of the transmission mechanism, whereas the shaft 9 is the driven shaft, although the order may be reversed when a reverse operation of the transmission mechanism is desired, and as will be clearly apparent to those skilled in the art.

The shaft 9 has a squared or feathered portion 13 between the bearing 6 and the tubular shaft 8, and upon which a friction wheel 14 is slidable, so that the friction wheel 14 may be shifted longitudinally along the shaft 9, and will be constructed to rotate therewith, or rather, the shaft 9 will be constrained to rotate with the friction wheel 14. The friction wheel 14 has the hub 15 which is slidably engaged upon the squared portion of the shaft 9.

As a means for shifting or adjusting the friction wheel 14, a longitudinal screw 16 is disposed above the shaft 9 and is journaled through pillow blocks or bearings 17 mounted upon the frames 2 and 3 above the standards 4, and a nut 18 is threaded upon the screw 16 between the pillow blocks or bearings 17, and is provided with a depending fork 19 straddling the friction wheel 14 and having its arms embracing the end portions or bosses of the hub 15, whereby the friction wheel 14 will be moved longitudinally with the nut 18, when the screw 16 is rotated. The screw 16 may be rotated in any suitable manner, either mechanically or manually.

The operative connection between the shafts 8 and 9 embodies a pair of opposite horizontal friction cones 20 located at the opposite sides of the friction wheel 14, and having their adjacent portions parallel and lying adjacent the periphery of the friction wheel, so that the friction wheel is disposed between the cones 20. The axes of the cones are disposed obliquely, and the larger ends of the cones are arranged adjacent the front or head frame 2, the cones being mounted upon oblique shafts 21. The shafts 21 are carried by front and rear carriers or slides 22 and 23, which are slidable within the guides formed by the front and rear frames 2 and 3 and the corresponding portions of the base. The slides 22 and 23 have oblique bearings 24 through which the end portions of the cone shafts 21 are journaled. The slides 22 and 23 are movable transversely in their respective guides, whereby the cones 20 may be shifted laterally to and from the friction wheel, as will hereinafter more fully appear.

Bevel gears 25 are keyed upon the cone shafts 21 adjacent the smaller ends of the cones, or between the rear or tail ends of the cones and the rear or tail slides 23, and intermesh with a bevel gear 26 keyed upon the inner protruding portion of the tubular shaft 8. The gears 25 are arranged to completely intermesh with the gear 26 when the cones 20 are moved toward one another into frictional engagement with the friction wheel 14, and when the cones 20 are separated so as to disengage the friction wheel, the gears 25 will be partially disengaged from the gear 26 but the gears will still be in mesh.

The means for adjusting or shifting the slides 22 and 23 includes a longitudinal rock shaft 27 disposed above the screw 16, and journaled through supplemental bearing portions of the pillow blocks or bearings 17. The rock shaft 27 is provided adjacent its forward and rear ends with cranks 28 and 29 projecting in the same direction from the axis of the shaft 27, and operatively engaged to front and rear pairs of levers 30 and 31, respectively. The inner or adjacent ends of the levers 30 and 31 are provided with slotted or bifurcated portions 32 engaging the respective cranks 28 and 29 and the outer or remote ends of the levers 30 and 31 are fulcrumed, as at 33, to the ends of the respective frames 2 and 3. The levers 30 and 31 converge from the fulcrums 33 to the cranks 28 and 29, respectively, and are arranged to be oscillated when the shaft 27 is rocked or oscillated due to the movement of the cranks 28 and 29 in the slotted portions of the said levers, as will be apparent. Depending links 34 are pivoted to the levers 30 and 31 adjacent their fulcrums, and their lower ends are pivoted to the joints of toggle links 35 pivoted to the respective slides 22 and 23 and to the ends of the respective frames 2 and 3.

In order to manually operate the rock shaft 27, a hand lever 36 is fulcrumed to a bracket 37 carried by one end of the frame 2, and a sprocket chain 38 is terminally secured to the hand lever 36 and is passed around a sprocket wheel 39 keyed upon one end of the shaft 27, whereby when the hand lever 36 is swung, it will rotate the shaft 27.

In operation, supposing the tubular driving shaft 8 to be rotated, when the hand lever 36 is swung properly so as to swing the cranks 28 and 29 downwardly, the said cranks will swing the levers 30 and 31 downwardly, and this will depress the links 34. The toggle links 35 will therefore be swung downwardly toward a straight line or alining position which will forcibly move the slides 22 and 23 toward the friction wheel shaft 9, and as a result the cones 20 will be forced into tight engagement with the friction wheel. Consequently, the gear 26 being rotated with the shaft 8, will rotate the cones 20, and the cones will in turn rotate the friction wheel 14 which will rotate the shaft 9 which is connected to the lathe or other driven device. The cones 20 may thus be forcibly moved toward one another to clamp the friction wheel 14 therebetween, which will hold the cones and friction wheel in tight engagement with one another, to prevent slipping, which is a salient feature of the present invention.

When it is desired to vary the speed of the driven element, the hand lever 36 is swung so as to raise the cranks 28 and 29, which will swing the respective levers 30 and 31 upwardly and thereby raise the toggle links 35, and this will result in the slides 22 and 23 being moved away from each other. The slides being separated will carry the cones 20 away from the friction wheel. The screw 16 is then rotated so as to shift the friction wheel 14 longitudinally to the position desired and after the friction wheel has been properly adjusted according to the speed desired, the cones are then moved toward one another to clamp and engage the friction wheel as above described. The friction wheel may thus be readily adjusted when the cones are separated, and without any interference between the cones and friction wheel.

When the friction wheel is arranged adjacent the smaller ends of the cones it will be evident that the shaft 9 will rotate relatively slow compared with the shaft 8, whereas when the friction wheel is arranged adjacent the larger ends of the cones, the shaft 9 will be rotated at greater velocity relative to the shaft 8. It is natural that by shifting the friction wheel to various points along the lengths of the cones, the speed may be governed to a nicety.

It is also manifest that the power instead of being applied to the shaft 8, can be applied to the shaft 9, so that the shaft 8 is the driven shaft, since the present mechanism is arranged to operate in reversed directions with equal propriety and success.

The present mechanism compared with ordinary transmissions embodying a cone or a plurality of cones, has decided and notable advantages thereover which will suggest themselves to those versed in the art, without lengthy comment being necessary.

Attention is directed to the fact that the rear frame 3 is shorter that the forward frame 2, which will naturally shorten the rear levers 31, but the rear slides 23 are made to move the same distance as the forward slides 22, since the rear crank 29 of the rock shaft 27 is shorter than the forward crank 28, which compensates for the shortening of the levers 31.

Having thus described the invention, what is claimed as new is:

1. In a variable speed transmission mechanism, a tubular shaft, a second shaft journaled therethrough, a third shaft movable to and from the said second shaft, gears carried by said second and third shafts, a longitudinally adjustable wheel carried by said second shaft, a cone carried by said third shaft and coöperating with said wheel, and means for moving said third shaft to and from said second shaft to move said cone and wheel into and out of engagement.

2. In a variable speed transmission mechanism, a pair of transverse guides, a pair of bearings carried by the said guides between the ends thereof, a tubular shaft journaled through one of said bearings, a second shaft journaled through the other bearing and said tubular shaft, a pair of slides mounted in each guide at the opposite sides of the respective bearing, a pair of shafts carried by the slides at the opposite sides of the second shaft, cones carried by said pair of shafts, a longitudinally adjustable wheel carried by the second shaft between and coöperable with the cones, coöperable gears carried by said tubular shaft and pair of shafts, and means for moving the said slides to and from each other.

3. In a variable speed transmission mechanism, a pair of transverse guides, a pair of bearings carried by the said guides between the ends thereof, a tubular shaft journaled through one of said bearings, a second shaft journaled through the other bearing and said tubular shaft, a pair of slides mounted in each guide at the opposite sides of the respective bearing, a pair of shafts carried by the slides at the opposite sides of the second shaft, cones carried by said pair of shafts, a longitudinally adjustable wheel carried by the second shaft between and coöperable with the cones, coöperable gears carried by said tubular shaft and pair of shafts, and means for moving the said slides to and from each other, including toggle links between the slides and ends of the guides.

4. In a variable speed transmission mechanism, a pair of transverse guides, a pair of bearings carried by the said guides between the ends thereof, a tubular shaft journaled through one of said bearings, a second shaft journaled through the other bearing and said tubular shaft, a pair of slides mounted in each guide at the opposite sides of the respective bearing, a pair of shafts carried by the slides at the opposite sides of the second shaft, cones carried by said pair of shafts, a longitudinally adjustable wheel carried by the second shaft between and coöperable with the cones, coöperable gears carried by said tubular shaft and pair of shafts, toggle links connecting the slides and ends of the guides, converging levers fulcrumed to the ends of the guides and connected to said toggle links, and a rock shaft operably engaged to said levers.

In testimony that I claim the foregoing as my own, I have hereto affixed my signature in the presence of two witnesses.

FRANK BELAND.

Witnesses:
F. W. YOUCH,
P. M. STUBBLEFIELD.